US012764731B2

(12) United States Patent
Bhamri et al.

(10) Patent No.: US 12,764,731 B2

(45) Date of Patent: Oct. 13, 2026

(54) SUPPLEMENTARY UPLINK CONFIGURATION FOR MULTI-CELL SCHEDULING

(71) Applicant: Apple Inc., Cupertino, CA (US)

(72) Inventors: Ankit Bhamri, Haar (DE); Sigen Ye, San Diego, CA (US); Haitong Sun, Cupertino, CA (US); Weidong Yang, San Diego, CA (US); Wei Zeng, Saratoga, CA (US); Dawei Zhang, Saratoga, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 18/412,376

(22) Filed: Jan. 12, 2024

(65) Prior Publication Data

US 2024/0276478 A1 Aug. 15, 2024

Related U.S. Application Data

(60) Provisional application No. 63/485,236, filed on Feb. 15, 2023.

(51) Int. Cl.
*H04W 72/12* (2023.01)
*H04L 5/00* (2006.01)

(52) U.S. Cl.
CPC ........... *H04W 72/12* (2013.01); *H04L 5/0053* (2013.01)

(58) Field of Classification Search
CPC ............. H04W 72/12; H04W 72/1268; H04W 72/232; H04L 5/0053
See application file for complete search history.

(56) References Cited

U.S. PATENT DOCUMENTS

2019/0150173 A1* 5/2019 Lee ........................ H04W 76/27 370/329
2019/0222361 A1* 7/2019 Cheng ................. H04L 25/0226
2019/0313348 A1* 10/2019 MolavianJazi ..... H04W 52/281
2020/0169990 A1* 5/2020 Takeda ................ H04W 52/146
2020/0275494 A1* 8/2020 Ingale ................... H04L 5/0053
2020/0281022 A1* 9/2020 Pelletier .............. H04W 52/367
2020/0314820 A1* 10/2020 Kim ...................... H04L 5/0058
2020/0337102 A1* 10/2020 Wang .................... H04W 76/18
2020/0344832 A1* 10/2020 Hu .................... H04W 72/0453
2020/0367289 A1* 11/2020 Choi ..................... H04W 24/10
2022/0030632 A1* 1/2022 Jeon ...................... H04W 16/14
2022/0150036 A1* 5/2022 Ye ......................... H04L 5/0098
2022/0304112 A1* 9/2022 Kumar .................. H04W 72/23
2022/0408464 A1* 12/2022 MolavianJazi ... H04W 72/1273
2023/0139269 A1* 5/2023 MolavianJazi ....... H04L 5/0044 370/329
2023/0156704 A1* 5/2023 Wang .................... H04L 1/1896 370/329
2023/0164754 A1* 5/2023 Liu ....................... H04L 5/0048 370/329

(Continued)

FOREIGN PATENT DOCUMENTS

WO WO-2021135251 A1 * 7/2021 ........... H04W 72/23

*Primary Examiner* — Jael M Ulysse

(74) *Attorney, Agent, or Firm* — Kilpatrick Townsend & Stockton LLP

(57) ABSTRACT

The present application relates to devices and components including apparatus, systems, and methods to provide supplemental uplink configuration for single downlink control information based multi-cell scheduling.

20 Claims, 8 Drawing Sheets

(56) References Cited

U.S. PATENT DOCUMENTS

| | | | | |
|---|---|---|---|---|
| 2023/0262561 | A1* | 8/2023 | Lin | H04W 36/185<br>370/331 |
| 2023/0276410 | A1* | 8/2023 | Chen | H04W 72/02<br>370/329 |
| 2023/0276505 | A1* | 8/2023 | Jeon | H04W 74/0833<br>370/332 |
| 2023/0345460 | A1* | 10/2023 | MolavianJazi | H04W 72/1263 |
| 2023/0354331 | A1* | 11/2023 | MolavianJazi | H04L 5/001 |
| 2023/0413246 | A1* | 12/2023 | Nogami | H04W 72/0446 |
| 2024/0187183 | A1* | 6/2024 | Lim | H04L 5/005 |
| 2024/0204931 | A1* | 6/2024 | Xiong | H04L 5/0053 |
| 2024/0250799 | A1* | 7/2024 | Rastegardoost | H04L 5/0094 |
| 2024/0251396 | A1* | 7/2024 | Choi | H04W 72/23 |
| 2025/0062864 | A1* | 2/2025 | Wang | H04L 1/1614 |
| 2025/0254696 | A1* | 8/2025 | Yi | H04W 72/23 |

* cited by examiner

300

302 304

| Index | Cell ID with SUL carrier |
|---|---|
| 0 | Cell 0 |
| 1 | Cell 1 |
| 2 | Cell 2 |
| 3 | Cell 3 |

FIG. 3

400

402 404

| Index | Cell ID with SUL carrier |
|---|---|
| 0 | No SUL |
| 1 | Cell 1 |
| 2 | Cell 2 |
| 3 | Cell 3 |

FIG. 4

SUPPLEMENTARY UPLINK CONFIGURATION FOR MULTI-CELL SCHEDULING

CROSS-REFERENCE TO RELATED APPLICATIONS

This application claims priority to U.S. provisional application No. 63/485,236, entitled "Supplementary Uplink Configuration for Multi-cell Scheduling," filed on Feb. 15, 2023, the disclosure of which is incorporated by reference herein in its entirety for all purposes.

TECHNICAL FIELD

The present application relates to the field of wireless technologies and, in particular, to supplementary uplink configuration with single downlink control information based multi-cell scheduling.

BACKGROUND

Third Generation Partnership Project (3GPP) networks provide carriers for carry data transmitted between user equipments and base stations. The networks can provide uplink carriers and supplementary uplink carriers for transmissions in the uplink direction. The uplink carriers and supplementary uplink carriers are separately configured for a user equipment. In legacy networks, the supplementary uplink carriers were required to be configured with a downlink control information message per cell, such that each cell required a separate downlink control information message to configure.

BRIEF DESCRIPTION OF THE DRAWINGS

FIG. 3 illustrates an example mapping table for approach 2 in accordance with some embodiments.

FIG. 4 illustrates an example mapping table for approach 2 in accordance with some embodiments.

DETAILED DESCRIPTION

Figure 1:
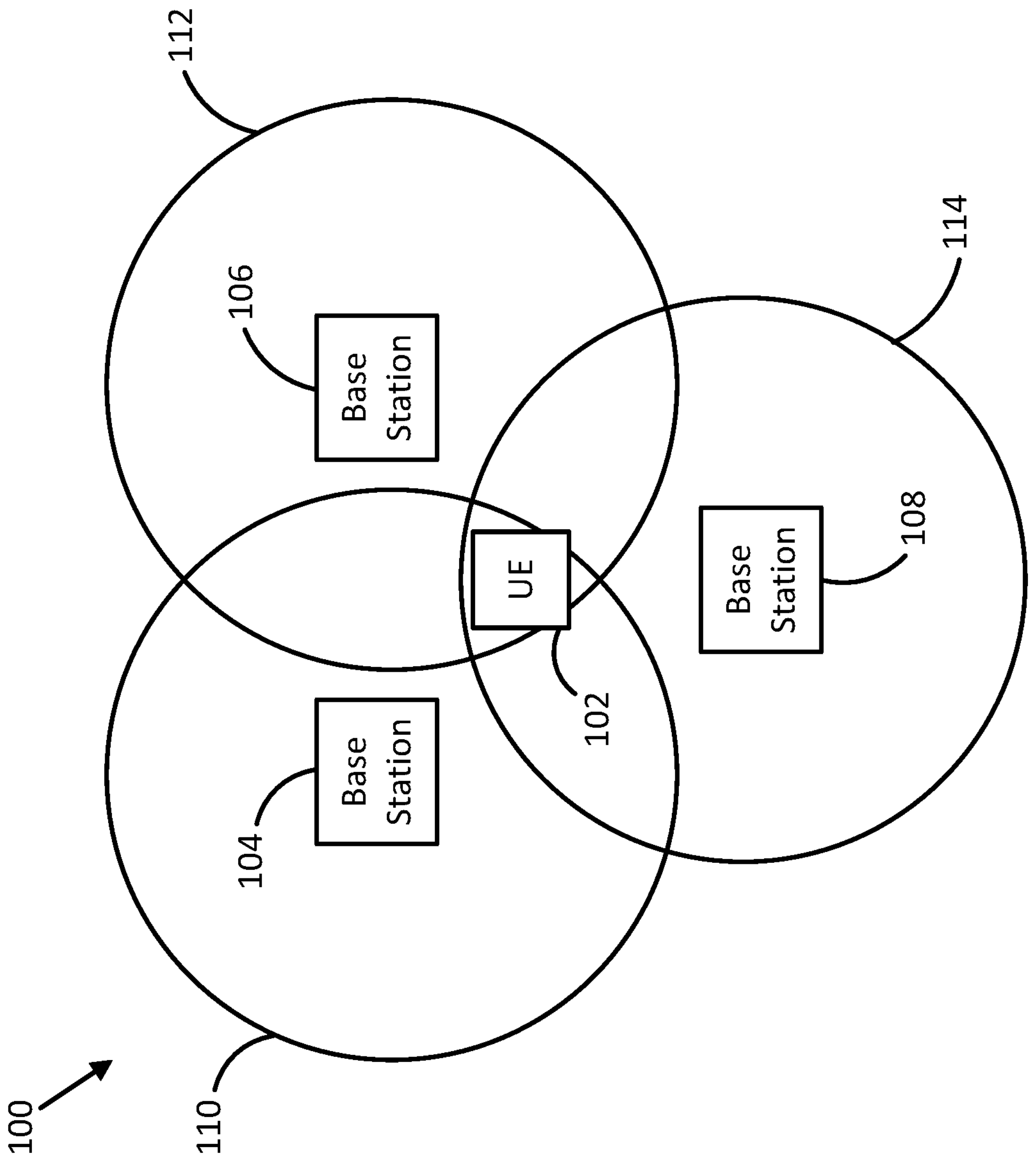
FIG. 1 illustrates an example network arrangement in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B); and the phrase "based on A" means "based at least in part on A," for example, it could be "based solely on A" or it could be "based in part on A."

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

The prefix "multi" as used herein refers to two or more. For example, the term "multi-cell" as used herein may refer to two or more cells. Further, the term "multi-carrier" may refer to two or more carriers.

In third generation partnership project (3GPP) new radio (NR) release 18 (Rel-18), multi-carrier enhancements related to multi-cell scheduling by single downlink control information (DCI) is introduced. The multi-carrier enhancements related to the multi-cell scheduling by single DCI may fulfill the following objectives. In particular, an approach for multi-cell physical uplink shared channel (PUSCH)/physical downlink shared channel (PDSCH) scheduling (one PDSCH/PUSCH per cell) with a single DCI is presented herein. The approach may identify the maximum number of cells that can be scheduled simultaneously, consider both intra-band and inter-band carrier aggregation (CA) operation, consider both frequency range 1 (FR1) and frequency range 2 (FR2), and/or the single DCI is optimized for 4 cells for the multi-cell PUSCH/PDSCH scheduling.

Approaches for if and how to support one or more supplementary uplink (SUL) indication via single DCI format for multi-cell scheduling have been presented. For a legacy DCI format, a user equipment (UE) can be indicated whether SUL carrier is activated/used or not by a single bit size field. In the legacy DCI format, the SUL carrier configuration for each cell is provided by separate DCI messages.

However, for new DCI format for multi-cell scheduling, indications regarding if and how such functionality can be supported may be included in the DCI format. Approaches described throughout this disclosure consider the scenario when one or multiple SUL carriers can be supported on multiple cells that can be co-scheduled by a single DCI. In particular, a base station may provide a single DCI message to configure a UE for scenarios when one or more multiple SUL carriers can be supported on multiple cells that can be co-scheduled.

The approaches described herein may provide for UE capability on how to indicate support for different modes of operation with SUL carriers. Further, the approaches address how to handle SUL/uplink (UL) indication with single-DCI based multi-cell scheduling. The approaches may also address how to handle multiple SUL carriers per cell and corresponding configuration/indication via legacy DCI as well via single-DCI based multi-cell scheduling.

FIG. 1 illustrates an example network arrangement 100 in accordance with some embodiments. The network arrangement 100 may implement one or more of the approaches described throughout this disclosure. For example, the network arrangement 100 may support multi-cell scheduling by a single DCI.

Figure 8:
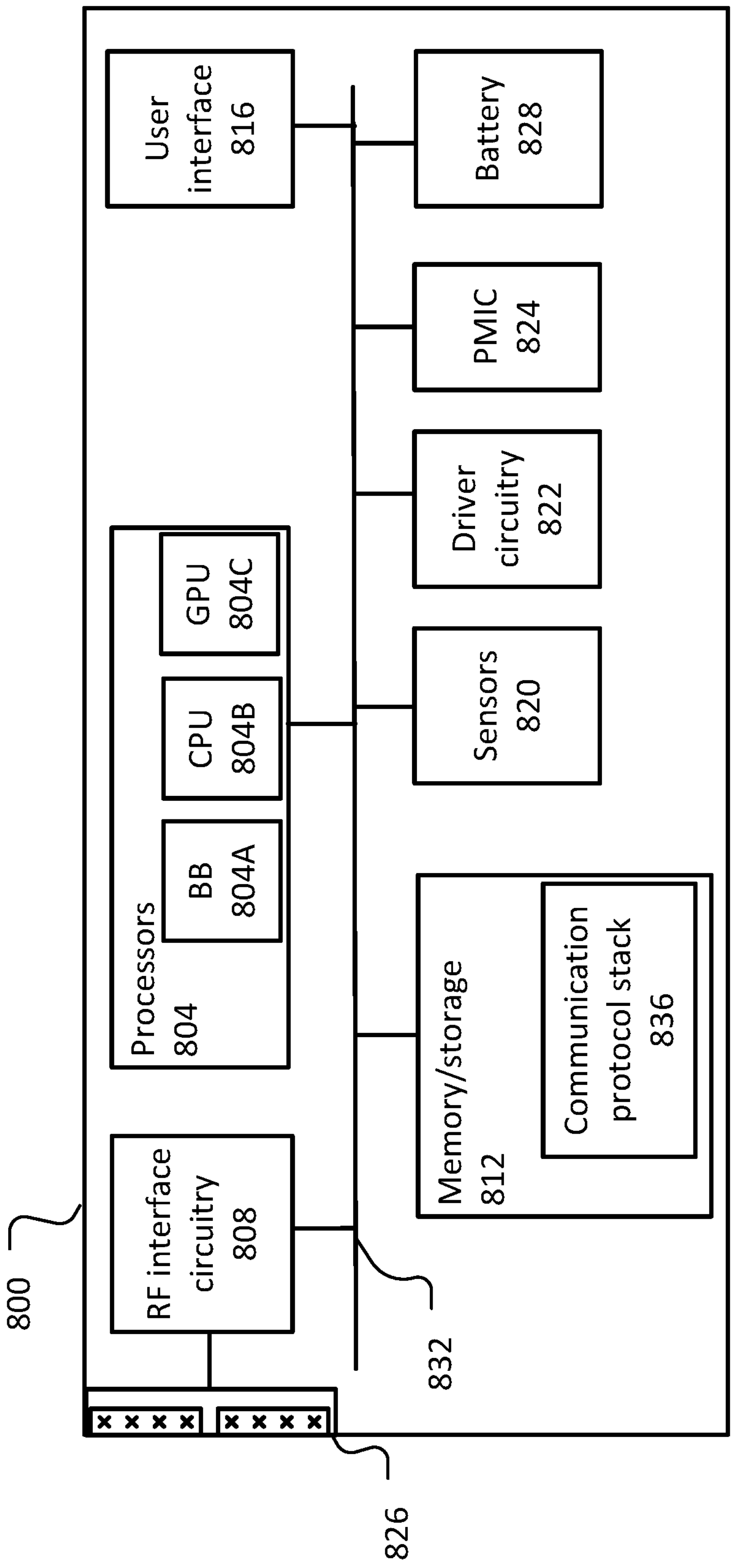
FIG. 8 illustrates an example UE in accordance with some embodiments.

The network arrangement 100 may include a UE 102. The UE 102 may include one or more of the features of the UE 800 (FIG. 8). The UE 102 may establish a connection with network via one or more base stations. One or more cells of the network may be configured to serve the UE 102.

Figure 9:
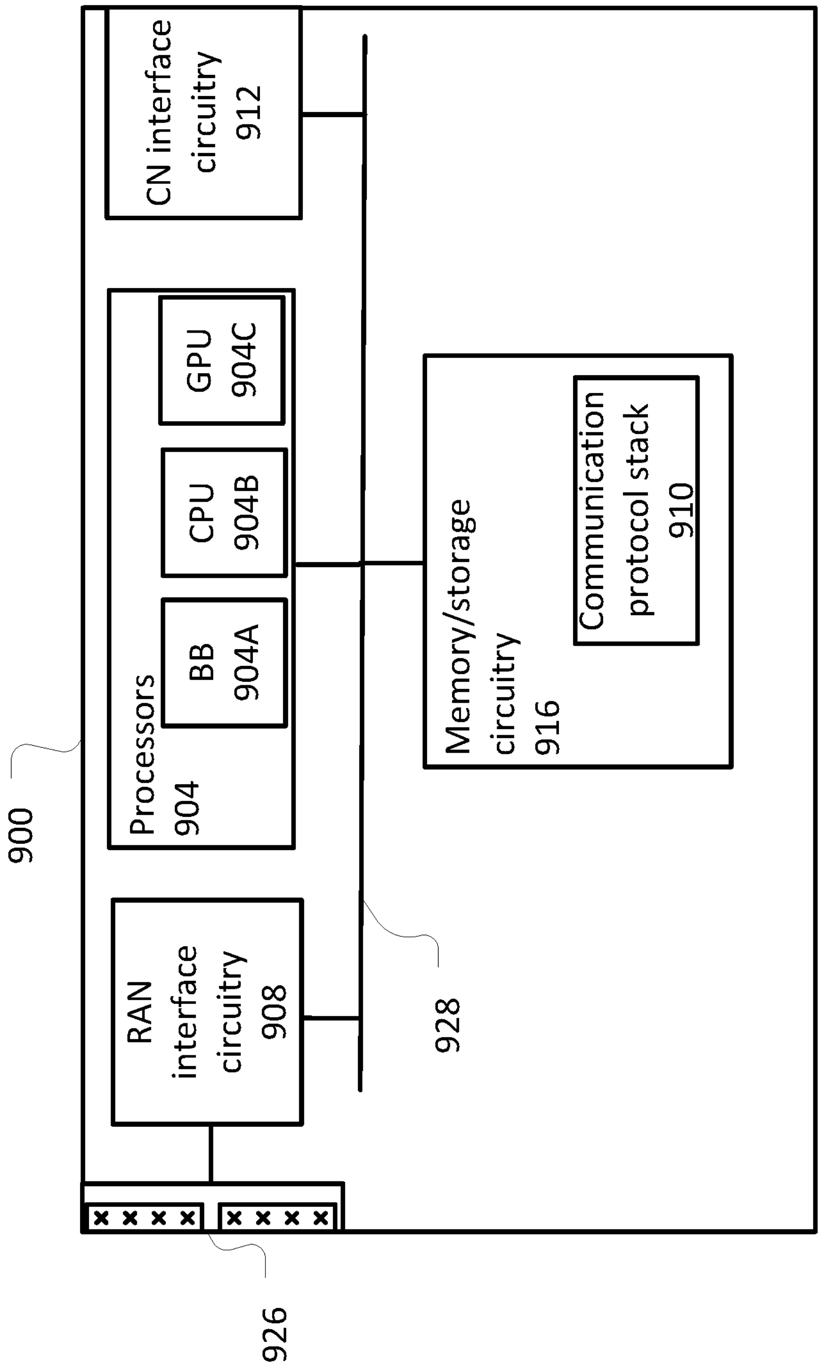
FIG. 9 illustrates an example next generation NodeB (gNB) in accordance with some embodiments.

The network arrangement 100 may include one or more base stations. For example, the network arrangement 100 includes a first base station 104, a second base station 106, and a third base station 108 in the illustrated embodiment. Each of the base stations may include one or more of the features of the next generation NodeB (gNB) 900 (FIG. 9).

Each of the base stations may host one or more cells. For example, the first base station 104 hosts a first cell 110, the second base station 106 hosts a second cell 112, and the third base station 108 hosts a third cell 114 in the illustrated embodiment. The base stations may utilize UL carriers and/or SUL carriers to communicate with UEs within the corresponding cells.

In the illustrated embodiment, the UE 102 is located within the first cell 110 hosted by the first base station 104, the second cell 112 hosted by the second base station 106, and the third cell 114 hosted by the third base station 108. The UE 102 may establish connections with the first base station 104, the second base station 106, and/or the third base station 108. When the UE 102 has established a connection with a base station, the UE 102 may utilize UL carriers and/or SUL carriers to transmit uplink messages to the base station.

The UE 102 may be configured for communicating via SUL carriers by a single DCI as discussed throughout this disclosure. For example, one of the base stations may transmit a single DCI that provides information related to SUL configuration for the first cell 110, the second cell 112, and/or the third cell 114. The UE 102 may be configured for SUL carriers based on the single DCI received from the base station.

Figure 2:
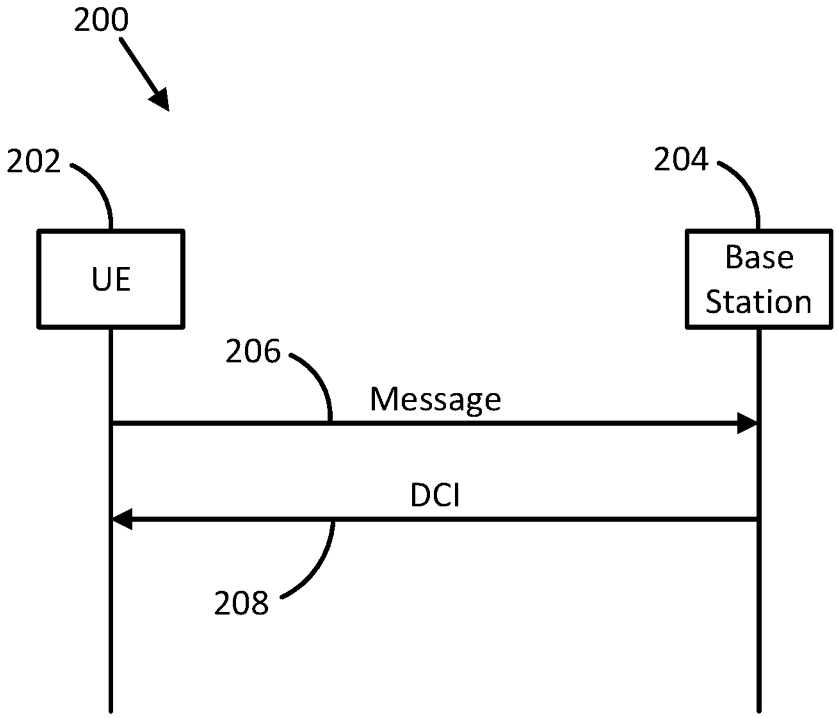
FIG. 2 illustrates an example signaling arrangement for single downlink control information (DCI) supplementary uplink (SUL) carrier configuration in accordance with some embodiments.

FIG. 2 illustrates an example signaling arrangement 200 for single DCI SUL carrier configuration in accordance with some embodiments. In particular, FIG. 2 illustrates a signaling chart that shows messages that may be exchanged between a UE and a base station to provide multi-cell scheduling for SUL carriers via a single DCI.

The signaling arrangement 200 may include a UE 202. The UE 202 may include one or more of the features of the UE 102 and/or the UE 800 (FIG. 8). The UE 202 may support connections via multiple cells, such as the first cell 110 (FIG. 1), the second cell 112 (FIG. 1), and/or the third cell 114 (FIG. 1).

The signaling arrangement 200 may include a base station 204. The base station 204 may include one or more of the features of the first base station 104 (FIG. 1), the second base station 106 (FIG. 1), the third base station 108 (FIG. 1), and/or the gNB 900 (FIG. 9). The base station 204 may host a cell, such as the first cell 110, the second cell 112, and/or the third cell 114.

The UE 202 may be located within the cell hosted by the base station 204 and may establish a connection. Further, the UE 202 may be located within one or more other cells, where messages between the UE 202 and the base station 204 may be utilized to configure the UE 202 related to SUL carriers for the cell hosted by the base station 204 and/or the one or more other cells.

The UE 202 may determine one or more modes of operation for SUL indication/configuration with single DCI based multi-cell scheduling supported by the UE 202. The UE 202 may transmit a message 206 to the base station that indicates the determined one or more modes of operation. In some embodiments, the message 206 may comprise a scheduling request message.

For example, according to approach 1, a UE can be report one or more of the following modes of operation for SUL indication/configuration with single DCI based multi-cell scheduling.

A Mode 0 may be a default mode. For mode 0, among the set of cells, only one cell may support SUL carrier, while the other cells may have only UL carrier (single bit is used to activate SUL, for example “1” to indicate SUL activation). For example, the UE 202 may determine that mode 0 is to be utilized when the UE 202 can support SUL carriers for one cell. The UE 202 may limit support to UL carriers for the other cells to which the UE 202 is connected. The UE 202 may generate the message 206 with an indication of mode 0 and transmit the message 206 to the base station 204 in these instances. If no mode is specifically reported by UE, then network can assume mode 0 (i.e., default mode). For example, the UE 202 may generate the message 206 without an indication of one of the modes and transmit the message 206 to the base station 204. The base station 204 may determine that the UE 202 supports mode 0 based on the lack of indication of modes.

For Mode 1, among the set of cells, more than one cell can support SUL carriers, but only one cell can be co-scheduled with SUL carrier. For example, the UE 202 may determine that mode 1 is to be utilized when the UE 202 can support SUL carriers for one cell, but only one cell can be co-scheduled with SUL carriers. The UE 202 may support UL carriers and SUL carriers being co-scheduled for one cell in mode 1. The UE 202 may generate the message 206 with an indication of mode 1 and transmit the message 206 to the base station 204.

For Mode 2, among the set of cells, more than one cell can support SUL carriers and one or more cells can be co-scheduled with SUL carriers (same number of bits as number of co-scheduled cells or maximum configured cells within a set to activate SUL corresponding to the co-scheduled cells). For example, the UE 202 may determine that mode 1 is to be utilized when the UE 202 can support SUL carriers for more than one cell and can support one or more cells being co-scheduled with SUL carriers. The UE 202 may support UL carriers and SUL carriers being co-scheduled for one or more cells in mode 2. The UE 202 may generate the message 206 with an indication of mode 2 and transmit the message 206 to the base station 204.

In embodiments of approach 1, if a UE reports more than one modes of operation for SUL indication/configuration with single DCI based multi-cell scheduling, then network can configure one or more of the reported modes of operation. For example, the UE 202 may determine that the UE 202 supports more than one of mode 0, mode 1, and/or mode 2. The UE 202 may generate the message 206 with indications of more than one of the modes above and transmit the message 206 to the base station 204. The base station 204 may determine that the UE 202 supports the multiple modes indicated within the message 206 and may configure the UE 202 according to the one or more of the multiple modes indicated with the message 206.

The base station 204 may receive the message 206 from the UE 202. The base station 204 may determine which of the modes the UE 202 supports based on the indication of the modes, or lack thereof, within the message 206. The base station 204 may determine SUL information and/or a SUL configuration to be provided to the UE 202 for configuring the UE for SUL carriers. The base station 204 may generate a DCI 208 that indicates the SUL information and/or the SUL configuration. The indication of the SUL information and/or the SUL configuration may comprise a bitfield having features of approach 2, approach 3, approach 4, and/or approach 5 described below. The base station 204 may transmit the DCI 208 to the UE 202.

The UE 202 may receive the DCI 208 transmitted by the base station 204. The UE 202 may identify the bitfield included in the DCI 208 and determine the SUL information and/or the SUL configuration based on the contents of the bitfield. The UE 202 may be configured for SUL in accordance with the SUL information and/or the SUL configuration determined based on the DCI 208.

According to approach 2, if UE reports mode 1 of operation for SUL indication/configuration with single DCI based multi-cell scheduling, then UE can be indicated with a DCI field to indicate which one of co-scheduled cells use SUL carrier. For example, if the message 206 indicates that the UE supports mode 1 for SUL indication/configuration with single DCI based multi-cell scheduling, then the DCI 208 may include a bitfield that indicates which one of co-scheduled use SUL carriers.

In some embodiments of approach 2, if the maximum number of co-scheduled cells by single DCI supported by UE is "N", then a $\log_2 N$ size bitfield can be used in the DCI to indicate which one of the co-scheduled cells use SUL carrier. For example, the base station 204 may determine a maximum number of co-scheduled cells, N, supported by the UE 202 that can be configured by the DCI 208. In some embodiments, the maximum number of co-scheduled cells, N, may be predefined (such as being defined by a specification related to the network). In other embodiments, the base station 204 may determine the maximum number of co-scheduled cells, N, based on information provided in the message 206 and/or information stored by the base station 204 related to the UE 202.

The base station 204 may then determine that the DCI 208 is to include a bitfield of size $\log_2 N$ to indicate which co-scheduled cell uses SUL carriers. In case if no SUL carrier is to be indicated for any of the co-scheduled cells, then this bitfield can be absent (i.e., 0 bits). For example, if the base station 204 determines that no co-scheduled cells are to use SUL carriers, the base station 204 may determine that the bitfield indicating which co-scheduled cell uses SUL carriers is to be omitted from the DCI 208. The base station 204 may generate the DCI 208 with the bitfield omitted or the bitfield of size $\log_2 N$, as determined.

FIG. 3 illustrates an example mapping table 300 for approach 2 in accordance with some embodiments. In particular, the mapping table 300 may be for the embodiments of approach 2 having a bitfield size of $\log_2 N$.

The illustrated mapping table 300 may be for an embodiment where the maximum number of co-scheduled cells is 4. Since 4 co-scheduled cells are supported, then 2 bits are used. The two bits in the bitfield may indicate an index 302. In particular, the two bits may indicate values of the index 302 equal to 0, 1, 2, and 3. Each of the values of the index 302 may correspond to a cell identifier (ID) 304 for a co-scheduled cell that uses SUL carrier. As can be seen from the mapping table 300, index 0 corresponds to cell 0, index 1 corresponds to cell 1, index 2 corresponds to cell 2, and index 3 corresponds to cell 3 in the illustrated. A bitfield within a DCI (such as the DCI 208 (FIG. 2)) may include bit values that indicate one of the indexes to indicate the cell ID corresponding to the co-scheduled cell that uses SUL carriers.

It should be understood that the mapping table 300 illustrates one example mapping and other mappings are possible in other embodiments. Further, mappings may include more or less mapping elements in embodiments where the maximum number of co-scheduled cells is different than 4.

In other embodiments of approach 2, if the maximum number of co-scheduled cells by single DCI supported by UE is "N", then a $\log_2(N+1)$ size bitfield can be used in the DCI to indicate which one of the co-scheduled cells use SUL carrier, wherein one code point is used to indicate no SUL is activated for any of the co-scheduled cells. For example, the base station 204 (FIG. 2) may determine a maximum number of co-scheduled cells, N, supported by the UE 202 (FIG. 2) that can be configured by the DCI 208 (FIG. 2). In some embodiments, the maximum number of co-scheduled cells, N, may be predefined (such as by a specification related to the network). In other embodiments, the base station 204 may determine the maximum number of co-scheduled cells, N, based on information provided in the message 206 (FIG. 2) and/or information stored by the base station 204 related to the UE 202.

The base station 204 may then determine that the DCI 208 (FIG. 2) is to include a bitfield of size $\log_2(N+1)$ to indicate which co-scheduled cell uses SUL carriers. In these embodiments, one of the code points (also referred to as indexes herein) that can be indicated by the base station 204 within the bitfield of the DCI 208 may indicate that no SUL is activated for any of the co-scheduled cells. The base station 204 may generate the DCI 208 with the bitfield of size $\log_2(N+1)$.

FIG. 4 illustrates an example mapping table 400 for approach 2 in accordance with some embodiments. In particular, the mapping table 400 may be for the embodiments of approach 2 having a bitfield size of $\log_2(N+1)$.

The illustrated mapping table 400 may be for an embodiment where the maximum number of co-scheduled cells is 3. Since 3 co-scheduled cells are supported, then 2 bits are used. The two bits in the bitfield may indicate an index 402. In particular, the two bits may indicate values of the index 402 equal to 0, 1, 2, and 3. Each of the values of the index 402 may correspond to a cell identifier (ID) 404 for a co-scheduled cell that uses SUL carrier or an indication that no SUL is activated. As can be seen from the mapping table 400, index 0 corresponds to no SUL being activated, index 1 corresponds to cell 1, index 2 corresponds to cell 2, and index 3 corresponds to cell 3 in the illustrated. A bitfield within a DCI (such as the DCI 208 (FIG. 2)) may include bit values that indicate one of the indexes to indicate the cell ID corresponding to the co-scheduled cell that uses SUL carriers, or that no SUL is activated for any of the co-scheduled cells.

It should be understood that the mapping table 400 illustrates one example mapping and other mappings are possible in other embodiments. Further, mappings may include more or less mapping elements in embodiments where the maximum number of co-scheduled cells is different than 3.

According to approach 3, for determining the number of bits for SUL indication, one of the following methods can be applied. In Method 1, a number of bits for SUL within a bitfield of a DCI (such as the DCI 208 (FIG. 2)) may be based on maximum number of supported cells within a set of cells. In method 1, the bitfield size may be independent of any other factor such as actually co-scheduled cells. In some embodiments, the maximum number of supported cells within a set of cells may be predefined (such as being defined by a specification related to the network). In other embodiments, the maximum number of supported cells within a set of cells may be indicated by a UE in a message (such as the message 206 (FIG. 2)).

In Method 2, a number of bits for SUL within a bitfield of a DCI (such as the DCI 208 (FIG. 2)) may be based on the number of configured cells within a set of cells. In method 2, the bitfield size may be smaller compared to method 1 as the number of configured cells within a set of cells can be smaller than the maximum number supported by UE. In some embodiments, the number of configured cells within a set of cells may be indicated by a UE in a message (such as the message 206 (FIG. 2)).

In Method 3, a number of bits for SUL within a bitfield of a DCI (such as the DCI 208 (FIG. 2)) may be based on the actual number of co-scheduled cells. In method 3, the bitfield size can be variable depending up on the number of actual co-scheduled cells by single DCI. For example, a size of the bitfield of the DCI may vary based on the number of co-scheduled cells that can be configured by a single DCI. In some embodiments, the actual number of co-scheduled cells may be indicated by a UE in a message (such as the message 206 (FIG. 2)).

In Method 4, a number of bits for SUL within a bitfield of a DCI (such as the DCI 208 (FIG. 2)) may be based on the number of cells within a set of cells configured or co-scheduled with SUL carrier. In method 4, the bitfield size may depend on the number of cells that are actually configured with SUL carriers. For example, if 4 cells (cell 1, cell 2, cell 3, and cell 4) are configured within a set of cells, but only cell 2 and cell 3 are configured with SUL carriers, then the bitfield size of 1 is sufficient, wherein "0" indicates cell 2 uses SUL carriers and "1" indicates cell 3 uses SUL carriers.

According to approach 4, a UE can support multiple SUL carriers for a cell and the DCI can indicate which SUL carrier(s) can be used for the cell. For example, a UE (such as UE 202 (FIG. 2)) may support multiple SUL carriers for a single cell. In this instance, a DCI (such as the DCI 208 (FIG. 2)) may indicate which SUL carrier or carriers can used for the cell.

In some embodiments of approach 4, only one SUL carrier can be indicated among the multiple supported SUL carriers for a cell. In some implementations of these embodiments, if "M" SUL carriers are supported for a cell, then $\lceil \log_2 M \rceil$ bits are used for a cell to indicate which one of the SUL carriers is used, if M>1, otherwise number of bits is equal to M. For example, a base station (such as the base station 204 (FIG. 2)) may determine that one SUL carrier can be indicated for a cell for a UE (such as the UE 202 (FIG. 2)). The base station may make the determination based on information received in a message (such as the message 206 (FIG. 2)) received from the UE. The base station may determine that a DCI (such as the DCI 208 (FIG. 2)) is to have a bitfield of a size $\lceil \log_2 M \rceil$ if M is greater than 1, or of a size M if M is less than or equal to 1 to indicate the one SUL carrier for the cell. The base station may generate the DCI with the bitfield to indicate the one SUL carrier.

In other implementations of these embodiments, if "M" SUL carriers are supported for a cell, then $\lceil \log_2(M+1) \rceil$ bits are used for a cell to indicate which one of the SUL carriers is used, if M>1, otherwise number of bits is equal to M. For example, a base station (such as the base station 204) may determine that one SUL carrier can be indicated for a cell for a UE (such as the UE 202). The base station may make the determination based on information received in a message (such as the message 206) received from the UE. The base station may determine that a DCI (such as the DCI 208) is to have a bitfield of a size $\lceil \log_2(M+1) \rceil$ if M is greater than 1, or of a size M if M is less than or equal to 1 to indicate the one SUL carrier for the cell. The base station may generate the DCI with the bitfield to indicate the one SUL carrier. In these implementations, one code point may be used to indicate that none of the SUL carriers for a cell are activated.

In other embodiments of approach 4, the number of bits is equal to the number of SUL carriers for a cell, wherein "0" for an SUL carrier indicates not activated, while "1" for a SUL carrier indicates activated. For example, a base station (such as the base station 204) may determine a number of SUL carriers for a cell servicing a UE (such as the UE 202 (FIG. 2)). In some embodiments, the number of SUL carriers for a cell may be predefined (such as being defined by a specification related to the network). In other embodiments, the base station may make the determination based on information received in a message (such as the message 206) received from the UE. The base station may determine that a DCI (such as the DCI 208) is to have a bitfield with a number of bits equal to the number of SUL carriers for the cell. Each bit may correspond to a corresponding SUL carrier for the cell, where each bit may be set with a value of 1 if the corresponding SUL carrier is activated and may be set with a value of 0 if the corresponding SUL carrier is not activated.

According to approach 5, if single DCI based multi-cell scheduling is used along with multiple SUL carriers per cell, then DCI bitfield size for SUL can be determined as follows for the three modes (defined in approach 1). For example, a DCI (such as the DCI 208 (FIG. 2)) may include a bitfield for SUL that has a size as defined based on the modes if single DCI based multi-cell scheduling is used along with multiple SUL carriers per cell for approach 5.

For Mode 0 in approach 5, $\lceil \log_2 M \rceil$ bits are used to indicate which one of SUL carriers from M SUL carriers per cell is used, if M>1, otherwise number of bits is equal to M. For example, a base station (such as the base station 204 (FIG. 2)) may determine a number of SUL carriers for a cell, M, to which a UE (such as the UE 202 (FIG. 2)) is connected. The base station may determine that a DCI (such as the DCI 208 (FIG. 2)) is to have a bitfield of size $\lceil \log_2 M \rceil$ bits if M is greater than 1, or a bitfield of size M if M is less than or equal to 1, to indicate which SUL carrier is to be used for the cell. The base station may generate the DCI with the bitfield of the determined size.

In other alternatives of mode 0 in approach 5, $\lceil \log_2(M+1) \rceil$ bits are used, where one code point is reserved to indicate that none of the SUL carrier is activated for the co-scheduled cell. For example, a base station (such as the base station 204) may determine a number of SUL carriers for a cell, M, to which a UE (such as the UE 202) is connected. The base station may determine that a DCI (such as the DCI 208) is to have a bitfield of size $\lceil \log_2(M+1) \rceil$ to indicate which SUL carrier is to be used for the cell. The base station may generate the DCI with the bitfield of the determined size.

For Mode 1 in approach 5, two bitfields may be used. For example, a DCI (such as the DCI 208) may include two bitfields that provide SUL information. A first bitfield is used to indicate which of the cells is activated with SUL carrier. For example, a first bitfield of the DCI may indicate which one or more cells are activated with SUL carriers. The first bitfield may be based on approach 2. For example, the first bitfield may include one or more of the features (such as the size of the bitfield) of the bitfields described in relation to approach 2. A second bitfield may be used to indicate which of the SUL carriers within the cell is used. For example, a second bitfield of the DCI may indicate which SUL carriers within a cell are used. The second bitfield may be based on approach 4. The second bitfield may be based on approach 4. For example, the second bitfield may include one or more of the features (such as the size of the bitfield) of the bitfields described in relation to approach 4.

In other alternatives of mode 1 in approach 5, a joint field can be used to indicate both the information of the first field and the second field (combination of first bitfield and second bitfield value from most significant bit (MSB) to least significant bit (LSB) or vice-versa). For example, a DCI (such as the DCI 208) may include a bitfield that indicates both which one or more cells are activated with SUL carriers and which SUL carriers within a cell are used. The bitfield may include bits corresponding to the first bitfield and bits corresponding to the second bitfield as described in the first alternative of mode 1 in approach 5 described above.

For Mode 2 in approach 5, $\Sigma_l\lceil\log_2 M_l\rceil$ bits are used to indicate which SUL carriers for which cells are activated. For example, a DCI (such as the DCI 208) may include a bitfield with a size of $\Sigma_l\lceil\log_2 M_l\rceil$ to indicate which SUL carriers for which cells are activated, where M is a number of SUL carriers for a cell. A base station (such as the base station 204) may determine a number of SUL carriers for a cell, M, to which a UE (such as the UE 202) is connected. The base station may determine that a DCI (such as the DCI 208) is to have a bitfield of size $\Sigma_l\lceil\log_2 M_l\rceil$ bits to indicate which SUL carriers for which cells are activated. The base station may generate the DCI with the bitfield of the determined size.

In other alternatives of mode 2 in approach 5, $\Sigma_1\lceil\log_2(M_l+1)\rceil$ bits are used, where for each co-scheduled cell, there is dedicated code point to indicate that none of the SUL carriers are activated. For example, a DCI (such as the DCI 208) may include a bitfield with a size of $\Sigma_l\lceil\log_2(M_l+1)\rceil$ to indicate which SUL carriers for which cells are activated, where M is a number of SUL carriers for a cell. A base station (such as the base station 204) may determine a number of SUL carriers for a cell, M, to which a UE (such as the UE 202) is connected. The base station may determine that a DCI (such as the DCI 208) is to have a bitfield of size $\Sigma_l\lceil\log_2(M_l+1)\rceil$ bits to indicate which SUL carriers for which cells are activated. The base station may generate the DCI with the bitfield of the determined size.

Figure 5:
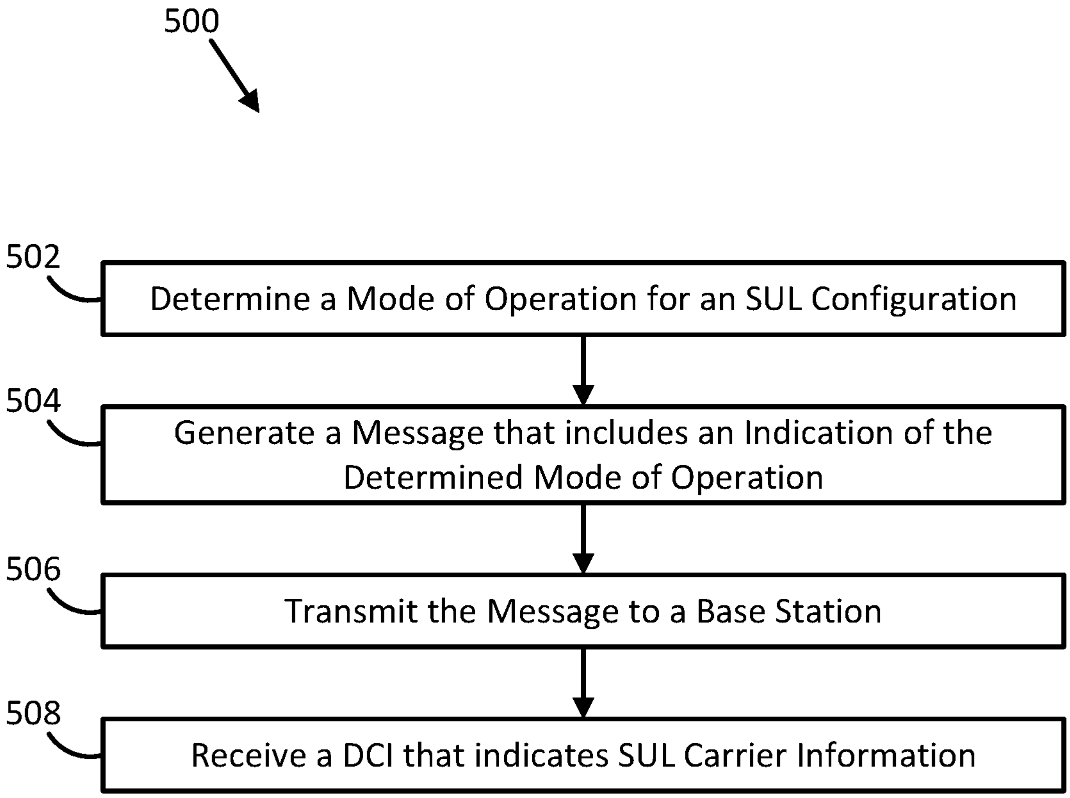
FIG. 5 illustrates an example procedure of operating a user equipment (UE) in accordance with some embodiments.

FIG. 5 illustrates an example procedure 500 of operating a UE in accordance with some embodiments. For example, the UE 102 (FIG. 1), the UE 202 (FIG. 2), and/or the UE 800 (FIG. 8) may perform the procedure 500. The UE may perform the procedure 500 as part of a process for configuration of an SUL for single DCI based multi-cell scheduling.

The procedure 500 may include determining a mode of operation for an SUL configuration in 502. For example, the UE may determine a mode of operation for an SUL configuration for the UE for single DCI based multi-cell scheduling. In some embodiments, the mode of operation may have one cell that supports SUL carriers and other cells that are limited to UL carriers with a set. In some embodiments, the mode of operation may have more than one cell that can support SUL carriers and one cell that can be co-scheduled with SUL carriers. Further, the mode of operation may have more than one cell that can support SUL carriers and one or more cells that can be co-scheduled with SUL carriers in other embodiments.

The procedure 500 may include generating a message that includes an indication of the determined mode of operation in 504. For example, the UE may generate a message that includes an indication of the determined mode of operation. In some embodiments, the message may comprise a single bit for activating SUL. For example, in embodiments where the mode of operation has one cell that supports SUL carriers and other cells that are limited to uplink carriers, the message may comprise a single bit for activating SUL.

The procedure 500 may include transmitting the message to a base station in 506. For example, the UE may transmit the message generated in 504 to a base station.

The procedure 500 may include receiving a DCI that indicates SUL carrier information in 508. For example, the UE may receive, from the base station, a DCI that indicates SUL carrier information for cells configured within a set to the UE.

In some embodiments, the DCI may include a bitfield that indicates the SUL carrier information, where a size of the bitfield may depend on a maximum number of supported cells. Further, the DCI may include a bitfield that indicates the SUL carrier information in some embodiments, where a size of the bitfield may depend on a number of configured cells. In some embodiments, the DCI may include a bitfield that indicates the SUL carrier information, where a size of the bitfield depends on a number of co-scheduled cells. Further, the DCI may include a bitfield that indicates the SUL carrier information, where a size of the bitfield depends on a number of cells configured or co-scheduled with SUL carriers.

In some embodiments, the DCI may include a bitfield of size $\lceil\log_2 M\rceil$ bits that indicates which SUL carrier is to be used for a cell if M is larger than 1 or a bitfield of size M bits that indicates which SUL carrier is to be used for a cell if M is equal to or less than 1. For these embodiments, M may be a number of SUL carriers supported for the cell.

In some embodiments, the DCI may include a bitfield of size $\lceil\log_2(M+1)\rceil$ bits that indicates which SUL carrier is to be used for a cell if M is larger than 1 or a bitfield of size M bits that indicates which SUL carrier is to be used for a cell if M is equal to or less than 1. For these embodiments, M may be a number of SUL carriers supported for the cell.

Further, the DCI may include a bitfield of a number of bits equal to a number of SUL carriers supported for a cell that indicates which SUL carrier is to be used for the cell in some embodiments.

The DCI may indicate which co-scheduled cells use SUL carriers in some embodiments. Further, the DCI may include a bitfield of size $\log_2$ N bits that indicates which co-scheduled cell uses SUL carriers in some embodiments, where N may be a maximum number of co-scheduled cells by single DCI supported by the UE. In some embodiments, the DCI may include a bitfield of size $\log_2(N+1)$ bits that indicates which co-scheduled cell uses SUL carriers in some of these instances, where N may be a maximum number of co-scheduled cells by single DCI supported by the UE.

In some embodiments, the DCI may include a bitfield of size $\lceil\log_2 M\rceil$ bits that indicates which SUL carrier is to be used if M is larger than one or a bitfield of size M that indicates which SUL carrier is to be used if M is less than or equal to one, where M may be a number of SUL carriers per cell. Further, the DCI may include a bitfield of size $\lceil\log_2(M+1)\rceil$ bits that indicates which SUL carrier is to be used if M is larger than one or a bitfield of size M that indicates which SUL carrier is to be used if M is less than or equal to one in some embodiments, where M may be a number of SUL carriers per cell.

In instances where the mode of operation has more than one cell that can support SUL carriers and one cell that can be co-scheduled with SUL carriers, the DCI may include some of the features described below. For example, the DCI may include a first bitfield that indicates which cell is activated with SUL carriers and a second bitfield that indicates which SUL carriers within the cell are to be used in some of these instances. Further, the DCI may include a bitfield that indicates which cell is activated with SUL carriers and which SUL carriers within the cell are to be used in some of these instances.

In instances where the mode of operation has more than one cell that can support SUL carriers and one or more cells that can be co-scheduled with SUL carriers, the DCI may include some of the features described below. For example, the DCI may include a bitfield of size $\Sigma_l\lceil\log_2 M_l\rceil$ bits that indicates which SUL carriers for which cells are activated in some of these instances, where M is a number of SUL carriers per cell. In some of these instances, the DCI may include a bitfield of size $\Sigma_l\lceil\log_2(M+1)\rceil$ bits that indicates which SUL carriers for which cells are activated, where M is a number of SUL carriers per cell.

While FIG. 5 may be interpreted to imply an order of operations of the procedure 500, it should be understood that the operations may be performed in a different order and/or one or more of the operations may be performed concurrently in other embodiments. Further, it should be understood that one or more of the operations may be omitted and/or one or more additional operations may be included in the procedure 500 in other embodiments.

Figure 6:
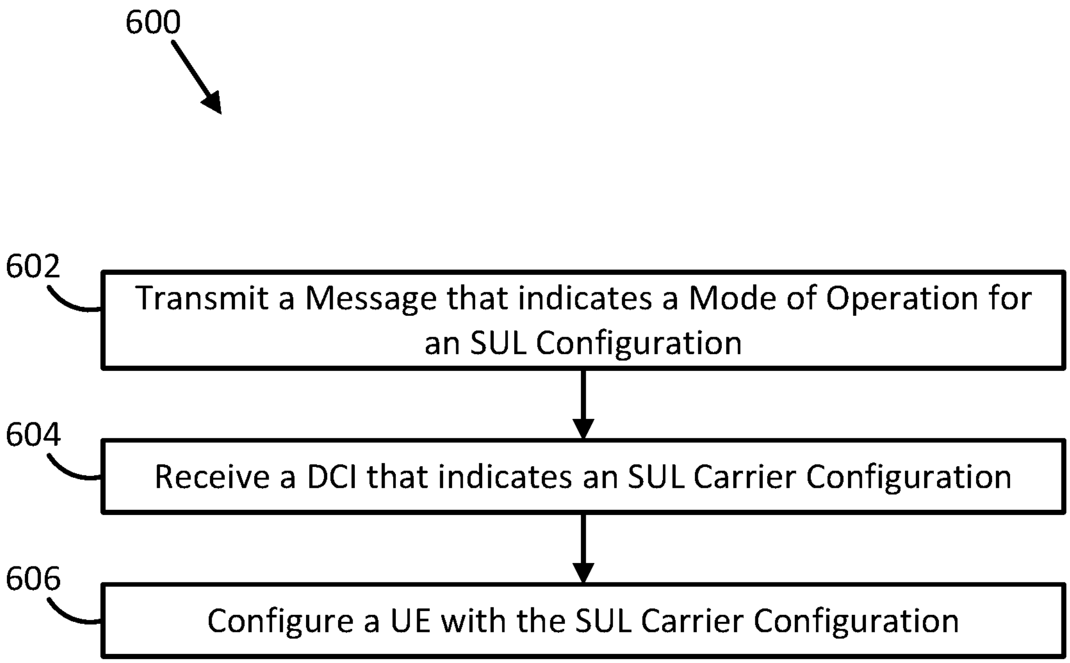
FIG. 6 illustrates an example procedure of operating a UE in accordance with some embodiments.

FIG. 6 illustrates an example procedure 600 of operating a UE in accordance with some embodiments. For example, the UE 102 (FIG. 1), the UE 202 (FIG. 2), and/or the UE 800 (FIG. 8) may perform the procedure 600. The UE may perform the procedure 600 as part of a process for configuration of an SUL for single DCI based multi-cell scheduling.

The procedure 600 may include transmitting a message that indicates a mode of operation for an SUL configuration in 602. For example, the UE may transmit, to a base station, a message that indicates a mode of operation for an SUL configuration for the UE for single DCI based multi-cell scheduling. In some embodiments, the mode of operation may have one cell that supports SUL carriers and other cells that are limited to UL carriers. In some of these embodiments, the message may comprise a single bit for activating SUL. In some embodiments, the mode of operation may have more than one cell that can support SUL carriers and one cell that can be co-scheduled with SUL carriers. Further, the mode of operation may have more than one cell that can support SUL carriers and one or more cells that can be co-scheduled with SUL carriers in some embodiments.

The procedure 600 may include receiving a DCI that indicates an SUL carrier configuration in 604. For example, the UE may receive, from the base station, a DCI that indicates an SUL carrier configuration to be implemented by the UE.

In some embodiments, the DCI may include a bitfield that indicates the SUL carrier configuration, where a size of the bitfield may depend on a maximum number of supported cells. Further, the DCI may include a bitfield that indicates the SUL carrier configuration in some embodiments, where the size of the bitfield may depend on a number of configured cells. In some embodiments, the DCI may include a bitfield that indicates the SUL carrier configuration, and where a size of the bitfield may depend on a number of co-scheduled cells. Further, the DCI may include a bitfield that indicates the SUL carrier configuration, where a size of the bitfield may depend on a number of cells configured or co-scheduled with SUL carriers.

In some embodiments, the DCI may include a bitfield of size $\lceil\log_2 M\rceil$ bits that indicates which SUL carrier is to be used for a cell if M is larger than one or a bitfield of size M bits that indicates which SUL carrier is to be used for a cell if M is equal to or less than one, where M may be a number of SUL carriers supported for the cell. Further, the DCI may include a bitfield of size $\lceil\log_2(M+1)\rceil$ bits that indicates which SUL carrier is to be used for a cell if M is larger than one or a bitfield of size M bits that indicates which SUL carrier is to be used for a cell if M is equal to or less than one in some embodiments, where M may be a number of SUL carriers supported for the cell. In some embodiments, the DCI may include a bitfield of a number of bits equal to a number of SUL carriers supported for a cell that indicates which SUL carrier is to be used for the cell.

In instances where the mode of operation has one cell that supports SUL carriers and other cells that are limited to UL carriers, the DCI may include some of the features described below. For example, the DCI may indicate which co-scheduled cells use SUL carriers in some of these instances.

Further, the DCI may include a bitfield of size $\log_2$ N bits that indicates which co-scheduled cell uses SUL carriers in some of these instances, where N may be a maximum number of co-scheduled cells by single DCI supported by the UE. In some of these instances, the DCI may include a bitfield of size $\log_2(N+1)$ bits that indicates which co-scheduled cell uses SUL carriers in some of these instances, where N may be a maximum number of co-scheduled cells by single DCI supported by the UE.

In some of these instances, the DCI may include a bitfield of size $\lceil\log_2 M\rceil$ bits that indicates which SUL carrier is to be used if M is larger than one or a bitfield of size M that indicates which SUL carrier is to be used if M is less than or equal to one, where M may be a number of SUL carriers per cell. Further, the DCI may include a bitfield of size $\lceil\log_2(M+1)\rceil$ bits that indicates which SUL carrier is to be used if M is larger than one or a bitfield of size M that indicates which SUL carrier is to be used if M is less than or equal to one in some of these instances, where M may be a number of SUL carriers per cell.

In instances where the mode of operation has more than one cell that can support SUL carriers and one cell that can be co-scheduled with SUL carriers, the DCI may include some of the features described below. For example, the DCI may include a first bitfield that indicates which cell is activated with SUL carriers and a second bitfield that indicates which SUL carriers within the cell are to be used in some of these instances. Further, the DCI may include a bitfield that indicates which cell is activated with SUL carriers and which SUL carriers within the cell are to be used in some of these instances.

In instances where the mode of operation has more than one cell that can support SUL carriers and one or more cells that can be co-scheduled with SUL carriers, the DCI may include some of the features described below. For example, the DCI may include a bitfield of size $\Sigma_l\lceil\log_2 M_l\rceil$ bits that indicates which SUL carriers for which cells are activated in some of these instances, where M is a number of SUL carriers per cell. In some of these instances, the DCI may include a bitfield of size $\Sigma_l\lceil\log_2(M_l+1)\rceil$ bits that indicates which SUL carriers for which cells are activated, where M is a number of SUL carriers per cell.

The procedure 600 may include configuring a UE with the SUL carrier configuration in 606. For example, the UE may configure the UE with the SUL carrier configuration for the single DCI based multi-cell scheduling.

While FIG. 6 may be interpreted to imply an order of operations of the procedure 600, it should be understood that the operations may be performed in a different order and/or one or more of the operations may be performed concurrently in other embodiments. Further, it should be understood that one or more of the operations may be omitted and/or one or more additional operations may be included in the procedure 600 in other embodiments.

Figure 7:
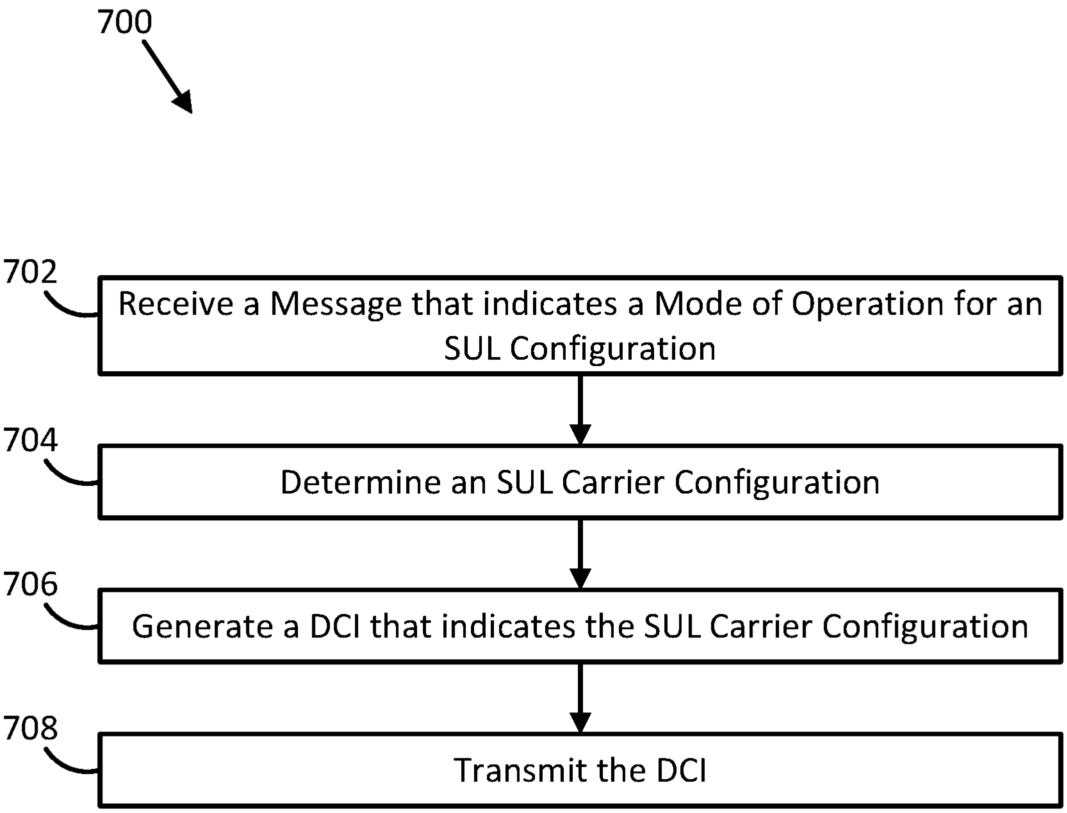
FIG. 7 illustrates an example procedure of operating a base station in accordance with some embodiments.

FIG. 7 illustrates an example procedure 700 of operating a base station in accordance with some embodiments. For example, the first base station 104 (FIG. 1), the second base station 106 (FIG. 1), the third base station 108 (FIG. 1), the base station 204 (FIG. 2), and/or the gNB 900 (FIG. 9) may perform the procedure 700. The base station may perform the procedure 700 as part of a process for configuration of an SUL for single DCI based multi-cell scheduling.

The procedure 700 may include receiving a message that indicates a mode of operation for an SUL configuration in

702. For example, the base station may receive, from a UE, a message that indicates a mode of operation for an SUL configuration for the UE for single DCI based multi-cell scheduling.

In some embodiments, the mode of operation may have one cell that supports SUL carriers and other cells that are limited to UL carriers. In some of these embodiments, the message may comprise a single bit for activating SUL.

Further, the mode of operation may have more than one cell that can support SUL carriers and one cell that can be co-scheduled with SUL carriers in some embodiments. In some embodiments, the mode of operation may have more than one cell that can support SUL carriers and one or more cells that can be co-scheduled with SUL carriers.

The procedure 700 may include determining an SUL carrier configuration in 704. For example, the base station may determine an SUL carrier configuration for the UE based on the mode of operation.

The procedure 700 may include generating a DCI that indicates the SUL carrier configuration in 706. For example, the base station may generate a DCI that indicates the SUL carrier configuration.

In some embodiments, the DCI may include a bitfield that indicates the SUL carrier configuration, where a size of the bitfield may depend on a maximum number of supported cells. Further, the DCI may include a bitfield that indicates the SUL carrier configuration in some embodiments, where the size of the bitfield may depend on a number of configured cells. In some embodiments, the DCI may include a bitfield that indicates the SUL carrier configuration, and where a size of the bitfield may depend on a number of co-scheduled cells. Further, the DCI may include a bitfield that indicates the SUL carrier configuration, where a size of the bitfield may depend on a number of cells configured or co-scheduled with SUL carriers.

In some embodiments, the DCI may include a bitfield of size $\lceil \log_2 M \rceil$ bits that indicates which SUL carrier is to be used for a cell if M is larger than one or a bitfield of size M bits that indicates which SUL carrier is to be used for a cell if M is equal to or less than one, where M may be a number of SUL carriers supported for the cell. Further, the DCI may include a bitfield of size $\lceil \log_2(M+1) \rceil$ bits that indicates which SUL carrier is to be used for a cell if M is larger than one or a bitfield of size M bits that indicates which SUL carrier is to be used for a cell if M is equal to or less than one in some embodiments, where M may be a number of SUL carriers supported for the cell. In some embodiments, the DCI may include a bitfield of a number of bits equal to a number of SUL carriers supported for a cell that indicates which SUL carrier is to be used for the cell.

In instances where the mode of operation has one cell that supports SUL carriers and other cells that are limited to UL carriers, the DCI may include some of the features described below. For example, the DCI may indicate which co-scheduled cells use SUL carriers in some of these instances.

Further, the DCI may include a bitfield of size $\log_2 N$ bits that indicates which co-scheduled cell uses SUL carriers in some of these instances, where N may be a maximum number of co-scheduled cells by single DCI supported by the UE. In some of these instances, the DCI may include a bitfield of size $\log_2(N+1)$ bits that indicates which co-scheduled cell uses SUL carriers in some of these instances, where N may be a maximum number of co-scheduled cells by single DCI supported by the UE.

In some of these instances, the DCI may include a bitfield of size $\lceil \log_2 M \rceil$ bits that indicates which SUL carrier is to be used if M is larger than one or a bitfield of size M that indicates which SUL carrier is to be used if M is less than or equal to one, where M may be a number of SUL carriers per cell. Further, the DCI may include a bitfield of size $\lceil \log_2(M+1) \rceil$ bits that indicates which SUL carrier is to be used if M is larger than one or a bitfield of size M that indicates which SUL carrier is to be used if M is less than or equal to one in some of these instances, where M may be a number of SUL carriers per cell.

In instances where the mode of operation has more than one cell that can support SUL carriers and one cell that can be co-scheduled with SUL carriers, the DCI may include some of the features described below. For example, the DCI may include a first bitfield that indicates which cell is activated with SUL carriers and a second bitfield that indicates which SUL carriers within the cell are to be used in some of these instances. Further, the DCI may include a bitfield that indicates which cell is activated with SUL carriers and which SUL carriers within the cell are to be used in some of these instances.

In instances where the mode of operation has more than one cell that can support SUL carriers and one or more cells that can be co-scheduled with SUL carriers, the DCI may include some of the features described below. For example, the DCI may include a bitfield of size $\Sigma_1 \lceil \log_2 M_l \rceil$ bits that indicates which SUL carriers for which cells are activated in some of these instances, where M is a number of SUL carriers per cell. In some of these instances, the DCI may include a bitfield of size $\Sigma_l \lceil \log_2(M_l+1) \rceil$ bits that indicates which SUL carriers for which cells are activated, where M is a number of SUL carriers per cell.

The procedure 700 may include transmitting the DCI in 708. For example, the base station may transmit, to the UE, the DCI.

FIG. 8 illustrates an example UE 800 in accordance with some embodiments. The UE 800 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 800 may be a RedCap UE or NR-Light UE.

The UE 800 may include processors 804, RF interface circuitry 808, memory/storage 812, user interface 816, sensors 820, driver circuitry 822, power management integrated circuit (PMIC) 824, antenna structure 826, and battery 828. The components of the UE 800 may be implemented as integrated circuits (ICs), portions thereof, discrete electronic devices, or other modules, logic, hardware, software, firmware, or a combination thereof. The block diagram of FIG. 8 is intended to show a high-level view of some of the components of the UE 800. However, some of the components shown may be omitted, additional components may be present, and different arrangement of the components shown may occur in other implementations.

The components of the UE 800 may be coupled with various other components over one or more interconnects 832, which may represent any type of interface, input/output, bus (local, system, or expansion), transmission line, trace, optical connection, etc. that allows various circuit components (on common or different chips or chipsets) to interact with one another.

The processors 804 may include processor circuitry such as, for example, baseband processor circuitry (BB) 804A, central processor unit circuitry (CPU) 804B, and graphics processor unit circuitry (GPU) 804C. The processors 804 may include any type of circuitry or processor circuitry that executes or otherwise operates computer-executable instructions, such as program code, software modules, or functional processes from memory/storage 812 to cause the UE 800 to perform operations as described herein. For example, the processors 1804 may include interface circuitry coupled with the BB 1804A, the CPU 1804B, and/or the GPU 1804C that can communicatively couple the BB 1804A, the CPU 1804B, and/or the GPU 1804C to the memory/storage 1812 for retrieval of the computer-executable instructions (among other operations) from the memory/storage 1812 for execution.

In some embodiments, the baseband processor circuitry 804A may access a communication protocol stack 836 in the memory/storage 812 to communicate over a 3GPP compatible network. In general, the baseband processor circuitry 804A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 808.

The baseband processor circuitry 804A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 812 may include one or more non-transitory, computer-readable media that includes instructions (for example, communication protocol stack 836) that may be executed by one or more of the processors 804 to cause the UE 800 to perform various operations described herein. The memory/storage 812 include any type of volatile or non-volatile memory that may be distributed throughout the UE 800. In some embodiments, some of the memory/storage 812 may be located on the processors 804 themselves (for example, L1 and L2 cache), while other memory/storage 812 is external to the processors 804 but accessible thereto via a memory interface. The memory/storage 812 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 808 may include transceiver circuitry and radio frequency front module (RFEM) that allows the UE 800 to communicate with other devices over a radio access network. The RF interface circuitry 808 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 826 and proceed to filter and amplify (with a low-noise amplifier) the signal. The signal may be provided to a receiver of the transceiver that down-converts the RF signal into a baseband signal that is provided to the baseband processor of the processors 804.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 826.

In various embodiments, the RF interface circuitry 808 may be configured to transmit/receive signals in a manner compatible with NR access technologies.

The antenna 826 may include antenna elements to convert electrical signals into radio waves to travel through the air and to convert received radio waves into electrical signals. The antenna elements may be arranged into one or more antenna panels. The antenna 826 may have antenna panels that are omnidirectional, directional, or a combination thereof to enable beamforming and multiple input, multiple output communications. The antenna 826 may include microstrip antennas, printed antennas fabricated on the surface of one or more printed circuit boards, patch antennas, phased array antennas, etc. The antenna 826 may have one or more panels designed for specific frequency bands including bands in FR1 or FR2.

The user interface circuitry 816 includes various input/output (I/O) devices designed to enable user interaction with the UE 800. The user interface 816 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 800.

The sensors 820 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 822 may include software and hardware elements that operate to control particular devices that are embedded in the UE 800, attached to the UE 800, or otherwise communicatively coupled with the UE 800. The driver circuitry 822 may include individual drivers allowing other components to interact with or control various input/ output (I/O) devices that may be present within, or connected to, the UE 800. For example, driver circuitry 822 may include a display driver to control and allow access to a display device, a touchscreen driver to control and allow access to a touchscreen interface, sensor drivers to obtain sensor readings of sensor circuitry 820 and control and allow access to sensor circuitry 820, drivers to obtain actuator positions of electro-mechanic components or control and allow access to the electro-mechanic components, a camera driver to control and allow access to an embedded image capture device, audio drivers to control and allow access to one or more audio devices.

The PMIC 824 may manage power provided to various components of the UE 800. In particular, with respect to the processors 804, the PMIC 824 may control power-source selection, voltage scaling, battery charging, or DC-to-DC conversion.

In some embodiments, the PMIC 824 may control, or otherwise be part of, various power saving mechanisms of the UE 800. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 800 may power down for brief intervals of time and thus save power. If there is no data traffic activity for an extended period of time, then the UE 800 may transition off to an RRC_Idle state, where it disconnects from the network and does not perform operations such as channel quality feedback, handover, etc. The UE 800 goes into a very low power state and it performs paging where again it periodically wakes up to listen to the network and then powers down again. The UE 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 828 may power the UE 800, although in some examples the UE 800 may be mounted deployed in a fixed location, and may have a power supply coupled to an electrical grid. The battery 828 may be a lithium ion battery, a metal-air battery, such as a zinc-air battery, an aluminum-air battery, a lithium-air battery, and the like. In some implementations, such as in vehicle-based applications, the battery 828 may be a typical lead-acid automotive battery.

FIG. 9 illustrates an example gNB 900 in accordance with some embodiments. The gNB 900 may include processors 904, RF interface circuitry 908, core network (CN) interface circuitry 912, memory/storage circuitry 916, and antenna structure 926.

The components of the gNB 900 may be coupled with various other components over one or more interconnects 928.

The processors 904, RF interface circuitry 908, memory/storage circuitry 916 (including communication protocol stack 910), antenna structure 926, and interconnects 928 may be similar to like-named elements shown and described with respect to FIG. 8.

The CN interface circuitry 912 may provide connectivity to a core network, for example, a 5th Generation Core network (5GC) using a 5GC-compatible network interface protocol such as carrier Ethernet protocols, or some other suitable protocol. Network connectivity may be provided to/from the gNB 900 via a fiber optic or wireless backhaul. The CN interface circuitry 912 may include one or more dedicated processors or FPGAs to communicate using one or more of the aforementioned protocols. In some implementations, the CN interface circuitry 912 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a user equipment (UE), comprising determining a mode of operation for a supplemental uplink (SUL) configuration for the UE for single downlink control information (DCI) based multi-cell scheduling, generating a message that includes an indication of the determined mode of operation, transmitting the message to a base station, and receiving, from the base station, a DCI that indicates SUL carrier information for cells configured with a set to the UE.

Example 2 may include the method of example 1, wherein the mode of operation has one cell that supports SUL carriers and other cells that are limited to uplink carriers within the set.

Example 3 may include the method of example 2, wherein the message comprises a single bit for activating SUL.

Example 4 may include the method of example 1, wherein the DCI indicates which co-scheduled cells use SUL carriers.

Example 5 may include the method of example 1, wherein the DCI includes a bitfield of size $\log_2 N$ bits that indicates which co-scheduled cell uses SUL carriers, wherein N is a maximum number of co-scheduled cells by single DCI supported by the UE.

Example 6 may include the method of example 1, wherein the DCI includes a bitfield of size $\log_2(N+1)$ bits that indicates which co-scheduled cell uses SUL carriers, wherein N is a maximum number of co-scheduled cells by single DCI supported by the UE.

Example 7 may include the method of example 1, wherein the DCI includes a bitfield of size $\lceil \log_2 M \rceil$ bits that indicates which SUL carrier is to be used if M is larger than one or a bitfield of size M that indicates which SUL carrier is to be used if M is less than or equal to one, wherein M is a number of SUL carriers per cell.

Example 8 may include the method of example 1, wherein the DCI includes a bitfield of size $\lceil \log_2(M+1) \rceil$ bits that indicates which SUL carrier is to be used if M is larger than one or a bitfield of size M that indicates which SUL carrier is to be used if M is less than or equal to one, wherein M is a number of SUL carriers per cell.

Example 9 may include the method of example 1, wherein the mode of operation has more than one cell that can support SUL carriers and one cell that can be co-scheduled with SUL carriers.

Example 10 may include the method of example 9, wherein the DCI includes a first bitfield that indicates which cell is activated with SUL carriers and a second bitfield that indicates which SUL carriers within the cell are to be used.

Example 11 may include the method of example 9, wherein the DCI includes a bitfield that indicates which cell is activated with SUL carriers and which SUL carriers within the cell are to be used.

Example 12 may include the method of example 1, wherein the mode of operation has more than one cell that can support SUL carriers and one or more cells that can be co-scheduled with SUL carriers.

Example 13 may include the method of example 12, wherein the DCI includes a bitfield of size $\Sigma_l \lceil \log_2 M_l \rceil$ bits that indicates which SUL carriers for which cells are activated, wherein M is a number of SUL carriers per cell.

Example 14 may include the method of example 12, wherein the DCI includes a bitfield of size $\Sigma_l \lceil \log_2(M_l+1) \rceil$ bits that indicates which SUL carriers for which cells are activated, wherein M is a number of SUL carriers per cell.

Example 15 may include the method of example 1, wherein the DCI includes a bitfield that indicates the SUL carrier information, and wherein a size of the bitfield depends on a maximum number of supported cells.

Example 16 may include the method of example 1, wherein the DCI includes a bitfield that indicates the SUL carrier information, and wherein a size of the bitfield depends on a number of configured cells.

Example 17 may include the method of example 1, wherein the DCI includes a bitfield that indicates the SUL carrier information, and wherein a size of the bitfield depends on a number of co-scheduled cells.

Example 18 may include the method of example 1, wherein the DCI includes a bitfield that indicates the SUL carrier information, and wherein a size of the bitfield depends on a number of cells configured or co-scheduled with SUL carriers.

Example 19 may include the method of example 1, wherein the DCI includes a bitfield of size $\lceil \log_2 M \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 20 may include the method of example 1, wherein the DCI includes a bitfield of size $\lceil \log_2(M+1) \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 21 may include the method of example 1, wherein the DCI includes a bitfield of a number of bits equal to a number of SUL carriers supported for a cell that indicates which SUL carrier is to be used for the cell.

Example 22 may include a method of operating a user equipment (UE) comprising transmitting, to a base station, a message that indicates a mode of operation for a supplemental uplink (SUL) configuration for the UE for single downlink control information (DCI) based multi-cell scheduling, receiving, from the base station, a DCI that indicates an SUL carrier configuration to be implemented by the UE, and configuring the UE with the SUL carrier configuration for the single DCI based multi-cell scheduling.

Example 23 may include the method of example 22, wherein the mode of operation has one cell that supports SUL carriers and other cells that are limited to uplink carriers.

Example 24 may include the method of example 23, wherein the message comprises a single bit for activating SUL.

Example 25 may include the method of example 22, wherein the DCI indicates which co-scheduled cells use SUL carriers.

Example 26 may include the method of example 22, wherein the DCI includes a bitfield of size $\log_2 N$ bits that indicates which co-scheduled cell uses SUL carriers, wherein N is a maximum number of co-scheduled cells by single DCI supported by the UE.

Example 27 may include the method of example 22, wherein the DCI includes a bitfield of size $\log_2(N+1)$ bits that indicates which co-scheduled cell uses SUL carriers, wherein N is a maximum number of co-scheduled cells by single DCI supported by the UE.

Example 28 may include the method of example 22, wherein the DCI includes a bitfield of size $\lceil \log_2 M \rceil$ bits that indicates which SUL carrier is to be used if M is larger than one or a bitfield of size M that indicates which SUL carrier is to be used if M is less than or equal to one, wherein M is a number of SUL carriers per cell.

Example 29 may include the method of example 22, wherein the DCI includes a bitfield of size $\lceil \log_2(M+1) \rceil$ bits that indicates which SUL carrier is to be used if M is larger than one or a bitfield of size M that indicates which SUL carrier is to be used if M is less than or equal to one, wherein M is a number of SUL carriers per cell.

Example 30 may include the method of example 22, wherein the mode of operation has more than one cell that can support SUL carriers and one cell that can be co-scheduled with SUL carriers.

Example 31 may include the method of example 30, wherein the DCI includes a first bitfield that indicates which cell is activated with SUL carriers and a second bitfield that indicates which SUL carriers within the cell are to be used.

Example 32 may include the method of example 30, wherein the DCI includes a bitfield that indicates which cell is activated with SUL carriers and which SUL carriers within the cell are to be used.

Example 33 may include the method of example 22, wherein the mode of operation has more than one cell that can support SUL carriers and one or more cells that can be co-scheduled with SUL carriers.

Example 34 may include the method of example 33, wherein the DCI includes a bitfield of size $\Sigma_l \lceil \log_2 M_l \rceil$ bits that indicates which SUL carriers for which cells are activated, wherein M is a number of SUL carriers per cell.

Example 35 may include the method of example 33, wherein the DCI includes a bitfield of size $\Sigma_l \lceil \log_2(M_l+1) \rceil$ bits that indicates which SUL carriers for which cells are activated, wherein M is a number of SUL carriers per cell.

Example 36 may include the method of example 22, wherein the DCI includes a bitfield that indicates the SUL carrier configuration, and wherein a size of the bitfield depends on a maximum number of supported cells.

Example 37 may include the method of example 22, wherein the DCI includes a bitfield that indicates the SUL carrier configuration, and wherein a size of the bitfield depends on a number of configured cells.

Example 38 may include the method of example 22, wherein the DCI includes a bitfield that indicates the SUL carrier configuration, and wherein a size of the bitfield depends on a number of co-scheduled cells.

Example 39 may include the method of example 22, wherein the DCI includes a bitfield that indicates the SUL carrier configuration, and wherein a size of the bitfield depends on a number of cells configured or co-scheduled with SUL carriers.

Example 40 may include the method of example 22, wherein the DCI includes a bitfield of size $\lceil \log_2 M \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 41 may include the method of example 22, wherein the DCI includes a bitfield of size $\lceil \log_2(M+1) \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 42 may include the method of example 22, wherein the DCI includes a bitfield of a number of bits equal to a number of SUL carriers supported for a cell that indicates which SUL carrier is to be used for the cell.

Example 43 may include a method of operating a base station comprising receiving, from a user equipment (UE), a message that indicates a mode of operation for a supplemental uplink (SUL) configuration for the UE for single downlink control information (DCI) based multi-cell scheduling, determining an SUL carrier configuration for the UE based on the mode of operation, generating a downlink control information (DCI) that indicates the SUL carrier configuration and transmitting, to the UE, the DCI.

Example 44 may include the method of example 43, wherein the mode of operation has one cell that supports SUL carriers and other cells that are limited to uplink carriers.

Example 45 may include the method of example 44, wherein the message comprises a single bit for activating SUL.

Example 46 may include the method of example 43, wherein the DCI indicates which co-scheduled cells use SUL carriers.

Example 47 may include the method of example 43, wherein the DCI includes a bitfield of size $\log_2 N$ bits that indicates which co-scheduled cell uses SUL carriers, wherein N is a maximum number of co-scheduled cells by single DCI supported by the UE.

Example 48 may include the method of example 43, wherein the DCI includes a bitfield of size $\log_2(N+1)$ bits that indicates which co-scheduled cell uses SUL carriers, wherein N is a maximum number of co-scheduled cells by single DCI supported by the UE.

Example 49 may include the method of example 43, wherein the DCI includes a bitfield of size $\lceil \log_2 M \rceil$ bits that indicates which SUL carrier is to be used if M is larger than one or a bitfield of size M that indicates which SUL carrier is to be used if M is less than or equal to one, wherein M is a number of SUL carriers per cell.

Example 50 may include the method of example 44, wherein the DCI includes a bitfield of size $\lceil \log_2(M+1) \rceil$ bits that indicates which SUL carrier is to be used if M is larger than one or a bitfield of size M that indicates which SUL carrier is to be used if M is less than or equal to one, wherein M is a number of SUL carriers per cell.

Example 51 may include the method of example 43, wherein the mode of operation has more than one cell that can support SUL carriers and one cell that can be co-scheduled with SUL carriers.

Example 52 may include the method of example 51, wherein the DCI includes a first bitfield that indicates which cell is activated with SUL carriers and a second bitfield that indicates which SUL carriers within the cell are to be used.

Example 53 may include the method of example 51, wherein the DCI includes a bitfield that indicates which cell is activated with SUL carriers and which SUL carriers within the cell are to be used.

Example 54 may include the method of example 43, wherein the mode of operation has more than one cell that can support SUL carriers and one or more cells that can be co-scheduled with SUL carriers.

Example 55 may include the method of example 54, wherein the DCI includes a bitfield of size $\Sigma_l \lceil \log_2 M_l \rceil$ bits that indicates which SUL carriers for which cells are activated, wherein M is a number of SUL carriers per cell.

Example 56 may include the method of example 54, wherein the DCI includes a bitfield of size $\Sigma_l \lceil \log_2(M_l+1) \rceil$ bits that indicates which SUL carriers for which cells are activated, wherein M is a number of SUL carriers per cell.

Example 57 may include the method of example 43, wherein the DCI includes a bitfield that indicates the SUL carrier configuration, and wherein a size of the bitfield depends on a maximum number of supported cells.

Example 58 may include the method of example 43, wherein the DCI includes a bitfield that indicates the SUL carrier configuration, and wherein a size of the bitfield depends on a number of configured cells.

Example 59 may include the method of example 43, wherein the DCI includes a bitfield that indicates the SUL carrier configuration, and wherein a size of the bitfield depends on a number of co-scheduled cells.

Example 60 may include the method of example 43, wherein the DCI includes a bitfield that indicates the SUL carrier configuration, and wherein a size of the bitfield depends on a number of cells configured or co-scheduled with SUL carriers.

Example 61 may include the method of example 43, wherein the DCI includes a bitfield of size $\lceil \log_2 M \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 62 may include the method of example 43, wherein the DCI includes a bitfield of size $\lceil \log_2(M+1) \rceil$ bits that indicates which SUL carrier is to be used for a cell if M is larger than one or a bitfield of size M bits that indicates which SUL carrier is to be used for a cell if M is equal to or less than one, and wherein M is a number of SUL carriers supported for the cell.

Example 63 may include the method of example 43, wherein the DCI includes a bitfield of a number of bits equal to a number of SUL carriers supported for a cell that indicates which SUL carrier is to be used for the cell.

Example 64 may include an apparatus comprising means to perform one or more elements of a method described in or related to any of examples 1-63, or any other method or process described herein.

Example 65 may include one or more non-transitory computer-readable media comprising instructions to cause an electronic device, upon execution of the instructions by one or more processors of the electronic device, to perform one or more elements of a method described in or related to any of examples 1-63, or any other method or process described herein.

Example 66 may include an apparatus comprising logic, modules, or circuitry to perform one or more elements of a method described in or related to any of examples 1-63, or any other method or process described herein.

Example 67 may include a method, technique, or process as described in or related to any of examples 1-63, or portions or parts thereof.

Example 68 may include an apparatus comprising: one or more processors and one or more computer-readable media comprising instructions that, when executed by the one or more processors, cause the one or more processors to perform the method, techniques, or process as described in or related to any of examples 1-63, or portions thereof.

Example 69 may include a signal as described in or related to any of examples 1-63, or portions or parts thereof.

Example 70 may include a datagram, information element, packet, frame, segment, PDU, or message as described in or related to any of examples 1-63, or portions or parts thereof, or otherwise described in the present disclosure.

Example 71 may include a signal encoded with data as described in or related to any of examples 1-63, or portions or parts thereof, or otherwise described in the present disclosure.

Example 72 may include a signal encoded with a datagram, IE, packet, frame, segment, PDU, or message as described in or related to any of examples 1-63, or portions or parts thereof, or otherwise described in the present disclosure.

Example 73 may include an electromagnetic signal carrying computer-readable instructions, wherein execution of the computer-readable instructions by one or more processors is to cause the one or more processors to perform the method, techniques, or process as described in or related to any of examples 1-63, or portions thereof.

Example 74 may include a computer program comprising instructions, wherein execution of the program by a processing element is to cause the processing element to carry out the method, techniques, or process as described in or related to any of examples 1-63, or portions thereof.

Example 75 may include a signal in a wireless network as shown and described herein.

Example 76 may include a method of communicating in a wireless network as shown and described herein.

Example 77 may include a system for providing wireless communication as shown and described herein.

Example 78 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:

determine a mode of operation associated with a configuration for single downlink control information (DCI) based multi-cell scheduling, wherein the mode of operation indicates a first number of cells for which SUL carriers are supported and a second number of cells with SUL carriers that are co-schedulable;

generate a message that includes an indication of the determined mode of operation, the message to be transmitted to a base station, the determined mode of operation indicating the first number of cells for which SUL carriers are supported and the second number of cells with SUL carriers that are co-schedulable; and identify, from the base station, a DCI that indicates SUL carrier information for cells configured within a set to a user equipment (UE).

2. The one or more non-transitory, computer-readable media of claim 1, wherein the mode of operation has one cell that supports SUL carriers and other cells that are limited to uplink carriers within the set.

3. The one or more non-transitory, computer-readable media of claim 1, wherein the DCI indicates which co-scheduled cells use SUL carriers.

4. The one or more non-transitory, computer-readable media of claim 1, wherein the DCI includes a bitfield of size $\log_2 N$ bits that indicates which co-scheduled cell uses SUL carriers, and wherein N is a maximum number of co-scheduled cells by single DCI supported by a device that includes the processing circuitry.

5. The one or more non-transitory, computer-readable media of claim 1, wherein the DCI includes a bitfield of size $\log_2(N+1)$ bits that indicates which co-scheduled cell uses SUL carriers, and wherein N is a maximum number of co-scheduled cells by single DCI supported by a device that includes the processing circuitry.

6. The one or more non-transitory, computer-readable media of claim 1, wherein the mode of operation has more than one cell that can support SUL carriers and one cell co-schedulable with SUL carriers.

7. The one or more non-transitory, computer-readable media of claim 1, wherein the mode of operation has more than one cell that can support SUL carriers and one or more cells co-schedulable with SUL carriers.

8. The one or more non-transitory, computer-readable media of claim 1, wherein the DCI includes a bitfield that indicates the SUL carrier information, and wherein a size of the bitfield depends on a maximum number of supported cells.

9. The one or more non-transitory, computer-readable media of claim 1, wherein the DCI includes a bitfield that indicates the SUL carrier information, and wherein a size of the bitfield depends on a number of configured cells.

10. The one or more non-transitory, computer-readable media of claim 1, wherein the DCI includes a bitfield that indicates which co-scheduled cells use SUL carriers, a size of the bitfield determined based at least in part on the second number of cells for which the UE supports co-scheduled SUL carriers.

11. An apparatus comprising:

processing circuitry to:

generate a message that indicates a mode of operation for a supplemental uplink (SUL) configuration for single downlink control information (DCI) based multi-cell scheduling, the message for transmission to a base station, the mode of operation indicating a first number of cells for which SUL carriers are supported and a second number of cells with SUL carriers that are co-schedulable;

identify, from the base station, a DCI that indicates an SUL carrier configuration to be implemented; and configure with the SUL carrier configuration for the single DCI based multi-cell scheduling; and interface circuitry coupled with the processing circuitry, the interface circuitry to transmit the message to the base station.

12. The apparatus of claim 11, wherein the mode of operation has one cell that supports SUL carriers and other cells that are limited to uplink carriers.

13. The apparatus of claim 11, wherein the DCI indicates which co-scheduled cells use SUL carriers.

14. The apparatus of claim 11, wherein the mode of operation has more than one cell that can support SUL carriers and one cell co-schedulable with SUL carriers.

15. A method comprising:

identifying, from a user equipment (UE), a message that indicates a mode of operation for a supplemental uplink (SUL) configuration for the UE for single downlink control information (DCI) based multi-cell scheduling, the mode of operation indicating a first number of cells for which SUL carriers are supported and a second number of cells with SUL carriers that are co-schedulable;

determining an SUL carrier configuration for the UE based on the mode of operation; and generating a downlink control information (DCI) that indicates the SUL carrier configuration for transmission to the UE.

16. The method of claim 15, wherein the DCI indicates which co-scheduled cells use SUL carriers.

17. The method of claim 15, wherein the mode of operation has more than one cell that can support SUL carriers and one cell co-schedulable with SUL carriers.

18. The method of claim 15, wherein the mode of operation has more than one cell that can support SUL carriers and one or more cells co-schedulable with SUL carriers.

19. The method of claim 15, further comprising:

determining a number of bits for indicating which SUL carriers are to be utilized by the UE based at least in part on the first number of cells for which SUL carriers are supported, wherein the DCI includes a bitfield with the determined number of bits to indicate which SUL carriers are to be utilized by the UE.

20. The method of claim 15, further comprising:

determining a number of bits for indicating which co-scheduled cells are to use SUL carriers based at least in part on the second number of cells with SUL carriers that are co-schedulable, wherein the DCI includes a bitfield with the determined number of bits to indicate which co-scheduled cells are to use SUL carriers.

* * * * *